(12) United States Patent
Yan et al.

(10) Patent No.: US 11,211,845 B2
(45) Date of Patent: Dec. 28, 2021

(54) SPEED REDUCTION APPARATUS AND ELECTROMECHANICAL DEVICE

(71) Applicant: Nidec Corporation, Kyoto (JP)

(72) Inventors: Guo-Jhih Yan, Taipei (TW); Huu-Tich Ngo, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 217 days.

(21) Appl. No.: 16/540,149

(22) Filed: Aug. 14, 2019

(65) Prior Publication Data

US 2020/0067382 A1 Feb. 27, 2020

(30) Foreign Application Priority Data

Aug. 24, 2018 (CN) .................... 201810970817.X (51) Int. Cl.
| | | |
|---|---|---|
| *H02K 7/116* | (2006.01) | |
| *F16H 1/28* | (2006.01) | |
| *H02K 5/04* | (2006.01) | |
| *H02K 21/24* | (2006.01) | |
| *F16H 57/02* | (2012.01) | |

(52) U.S. Cl.
CPC .............. *H02K 7/116* (2013.01); *F16H 1/28* (2013.01); *H02K 5/04* (2013.01); *H02K 21/24* (2013.01); *F16H 2057/02073* (2013.01)

(58) Field of Classification Search
CPC .......... H02K 7/116; H02K 5/04; H02K 21/24; H02K 5/163; H02K 16/02; F16H 1/28; F16H 2057/02073
USPC ............................................ 310/66, 99, 268
See application file for complete search history.

(56) References Cited

U.S. PATENT DOCUMENTS

| | | | | |
|---|---|---|---|---|
| 1,632,123 | A | * 6/1927 | Else .......................... | F16H 3/62 |
| | | | | 475/296 |
| 6,404,097 | B1 | * 6/2002 | Pullen .................. | H02K 1/2793 |
| | | | | 310/156.62 |
| 7,815,535 | B2 | 10/2010 | Ai et al. | |

(Continued)

FOREIGN PATENT DOCUMENTS

| | | |
|---|---|---|
| CN | 201293074 Y | 8/2009 |
| CN | 206041766 U | 3/2017 |

(Continued)

*Primary Examiner* — John K Kim
(74) *Attorney, Agent, or Firm* — Keating & Bennett (57) ABSTRACT

A speed reduction apparatus includes a motor and a speed reduction assembly. The motor includes a first rotating shaft and a second rotating shaft a second rotator and a first rotator, a stator, a first motor housing, a second motor, and a first bearing and a second bearing at a radial outer side of the first rotating shaft, the first bearing and the second bearing being axially located at the same side of the first rotator facing the first motor housing. The speed reduction assembly includes a first gear, third gears engaging with the first gear, and a second gear, an output shaft, the third gears turning the second gear to rotate, and the second gear driving the output shaft, and a bracket between the output shaft and the first rotating shaft, the first gear, the second gear and the third gears being located at an axial outer side of the first motor housing, and at least one of the first gear, the second gear and the third gears being located radial outer sides of the first bearing and the second bearing.

14 Claims, 9 Drawing Sheets

(56) References Cited

U.S. PATENT DOCUMENTS

| | | | | |
|---|---|---|---|---|
| 2005/0194855 A1* | 9/2005 | Hasebe | ............... | H02K 1/2793 |
| | | | | 310/156.43 |
| 2019/0085906 A1* | 3/2019 | Toda | ...................... | H02K 7/083 |
| 2019/0299769 A1* | 10/2019 | Li | ............................ | B60K 7/00 |
| 2020/0067382 A1* | 2/2020 | Yan | .......................... | F16H 1/28 |

FOREIGN PATENT DOCUMENTS

| | | |
|---|---|---|
| CN | 206894444 U | 1/2018 |
| JP | 2004-129374 A | 4/2004 |

\* cited by examiner

SPEED REDUCTION APPARATUS AND ELECTROMECHANICAL DEVICE

CROSS REFERENCE TO RELATED APPLICATION

The present invention claims priority under 35 U.S.C. § 119 to Chinese Application No. 201810970817.X filed on Aug. 24, 2018, the entire contents of which are hereby incorporated herein by reference.

1. FIELD OF THE INVENTION

This present disclosure relates to the electromechanical field, and in particular to a speed reduction apparatus and electromechanical device.

2. BACKGROUND

An actuator in combination with a motor and a reducer is a key component for application of a robot. In order to obtain a relatively large torque output, the reducer needs to have a relatively high reduction ratio, so that a high-speed low torque output of the motor is transformed into a low-speed high torque output.

In the prior art, there exist multiple schemes where a motor and a reducer are combined. For one example, in a first scheme, a reducer is disposed within a motor, the motor and the reducer share the same front cover, and the motor and the reducer are disposed in serial in an axial direction. In this scheme, the motor is designed as a radial-flux motor. For another example, in a second scheme, a motor is designed as having a cavity in the center, and a reducer is mounted within the cavity. In this scheme, the motor is designed as an axial-flux motor.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

It was discovered by the inventors that in the existing schemes where a motor and a reducer are combined, in order to obtain a relatively high driving capability, a relatively large volume is usually needed. For example, in the above-described first scheme, the motor and the reducer are combined in series in the axial direction, hence, an overall thickness of the motor in the axial direction is increased. And for another example, in the above-described second scheme, in order that the reducer is disposed in the cavity of the motor, an outer diameter of the motor is set relatively large.

Example embodiments of the present disclosure provide speed reduction apparatuses and electromechanical devices.

In a speed reduction apparatus according to an example embodiment of the present disclosure, two bearings of a dual-rotor motor are arranged at the same side of a stator in an axial direction, and gears of a reducer disposed in serial with the dual-rotor motor in an axial direction are located at radially outer sides of the two bearings. Hence, compact disposition of the dual-rotor motor and the reducer in the axial direction and the radial direction may be achieved, thus obtaining a speed reduction apparatus having a relatively small volume and a relatively good driving capability.

According to an aspect of an example embodiment of the present disclosure, there is provided a speed reduction apparatus, including a motor and a speed reduction assembly, the motor including a first rotating shaft and a second rotating shaft rotating around a central axis, a second rotator and a first rotator respectively at radial outer sides of the second rotating shaft and the first rotating shaft, a stator between the second rotator and the first rotator, a first motor housing at the first rotator away from an axial side of the stator, and a second motor housing at the second rotator away from another axial side of the stator, and the speed reduction assembly including a first gear at a side of the first motor housing spaced away from the motor; third gears engaging with the first gear, and a second gear, an output shaft, the third gears turning the second gear to rotate, and the second gear driving the output shaft, and a bracket between the output shaft and the first rotating shaft, the motor further including a first bearing and a second bearing at a radial outer side of the first rotating shaft, wherein the first bearing and the second bearing are axially located at the same side of the first rotator facing the first motor housing, the first gear, the second gear and the third gears are located at an axial outer side of the first motor housing, and at least one of the first gear, the second gear and the third gears is located at radial outer sides of the first bearing and the second bearing.

According to an aspect of an example embodiment of the present disclosure, the speed reduction assembly further includes a ring between the third gears and the first motor housing, wherein the ring abuts against a rotating shaft of the third gears.

According to an aspect of an example embodiment of the present disclosure, the second rotating shaft includes a hole extending in an axial direction, a connector to connect the first rotating shaft to the second rotating shaft being provided in the hole.

According to an aspect of an example embodiment of the present disclosure, the connector is a bolt.

According to an aspect of an example embodiment of the present disclosure, the second bearing is located at a side away from the first rotator in an axial direction of the first bearing, and an end portion of the first motor housing spaced away from the first rotator in the axial direction is flush with an end portion of the second bearing away from the first rotator in the axial direction.

According to an aspect of an example embodiment of the present disclosure, a radially outermost end of the bracket is located at a position closer to a radially internal side than a radially innermost end of the output shaft.

According to an aspect of an example embodiment of the present disclosure, a number of the third gears is more than two, and the more than two third gears are centered on the central axis.

According to an aspect of an example embodiment of the present disclosure, the first gear and the second gear are ring gears or sun gears, and the third gears are planetary gears.

According to an aspect of an example embodiment of the present disclosure, when the first gear and the second gear are ring gears, inner diameters of the first gear and the second gear are identical or different.

According to an aspect of an example embodiment of the present disclosure, the motor is an axial-flux motor.

According to an aspect of an example embodiment of the present disclosure, the speed reduction assembly further includes a bearing at a radial outer side of the output shaft.

According to an aspect of an example embodiment of the present disclosure, a radially outermost end of the first gear is located at a position closer to a radially internal side than a radially outermost end of the first motor housing.

According to an aspect of an example embodiment of the present disclosure, there is provided an electromechanical device, including the speed reduction apparatus as described in any one of the above aspects.

An advantage of the example embodiments of the present disclosure exists in that gears of a reducer disposed in parallel or substantially in parallel with the dual-rotor motor in an axial direction are located at radially outer sides of the two bearings. Hence, compact disposition of the dual-rotor motor and the reducer in the axial direction and the radial direction may be achieved, thus obtaining a speed reduction apparatus having a relatively small volume and a relatively good driving capability.

With reference to the following description and drawings, the particular example embodiments of the present disclosure are disclosed in detail, and the principles of this disclosure and the manners of use are indicated. It should be understood that the scope of the example embodiments of the present disclosure is not limited thereto. The example embodiments of the present disclosure contain many alterations, modifications and equivalents within the spirits and scope of the terms of the appended claims.

The above and other elements, features, steps, characteristics and advantages of the present disclosure will become more apparent from the following detailed description of the example embodiments with reference to the attached drawings.

BRIEF DESCRIPTION OF THE DRAWINGS

The drawings are included to provide further understanding of this disclosure, which constitute a part of the specification and illustrate the example embodiments of the present disclosure, and are used for setting forth the principles of the present disclosure together with the description. It is obvious that the accompanying drawings in the following description are some example embodiments of this disclosure, and for those of ordinary skills in the art, other accompanying drawings may be obtained according to these accompanying drawings without making an inventive effort.

DETAILED DESCRIPTION

These and further aspects and features of example embodiments of the present disclosure will be apparent with reference to the following description and attached drawings. In the description and drawings, particular example embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Furthermore, in the following description of this disclosure, for the convenience of the description, a radius direction taking a central axis of a first rotating shaft and a second rotating shaft of a motor as the center is referred to as "a radial direction", a direction surrounding the central axis is referred to as "a circumferential direction", an extension direction of the central axis and directions in parallel with it are referred to as "an axial direction", a direction of the motor pointing to the speed reduction assembly is referred to as "front direction", and a direction opposite to the "front direction" is referred to as "rear direction".

First Example Embodiment

Figure 1:
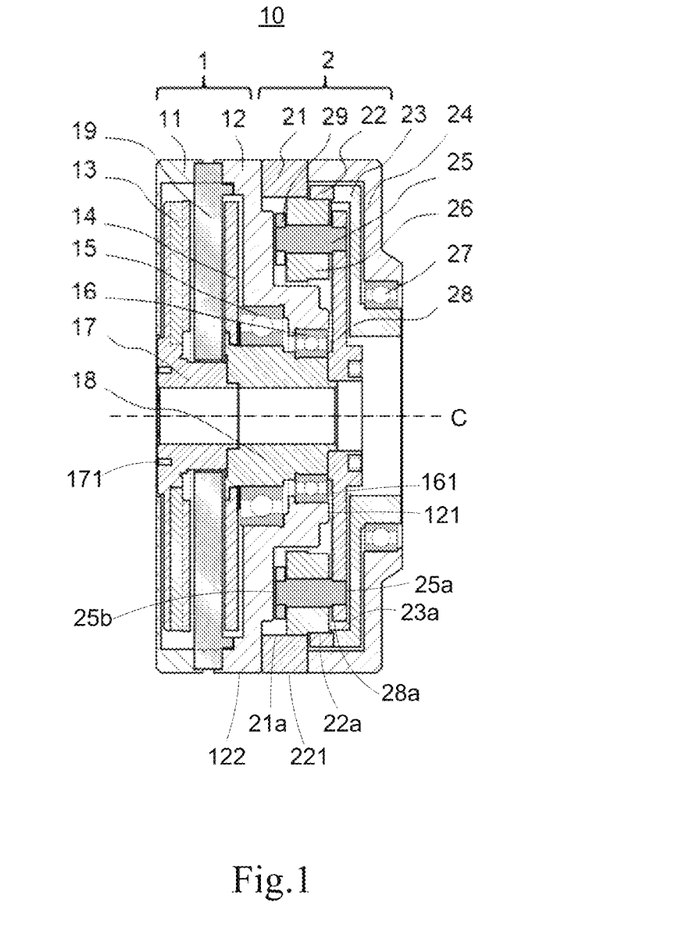
FIG. 1 is a cross sectional view of the speed reduction apparatus in an axial direction of Example Embodiment 1 of this disclosure.
Figure 2:
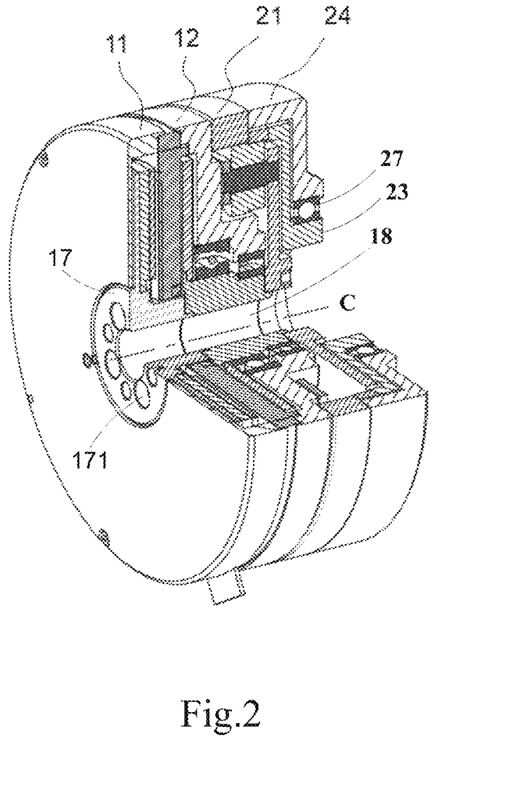
FIG. 2 is a perspective cross sectional view of the speed reduction apparatus of Example Embodiment 1 of this disclosure.
Figure 3:
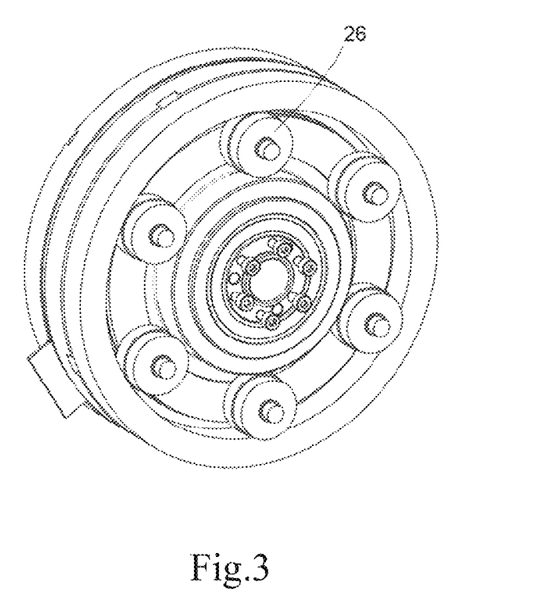
FIG. 3 is a perspective view of the speed reduction assembly of the speed reduction apparatus of Example Embodiment 1 of this disclosure.
Figure 4:
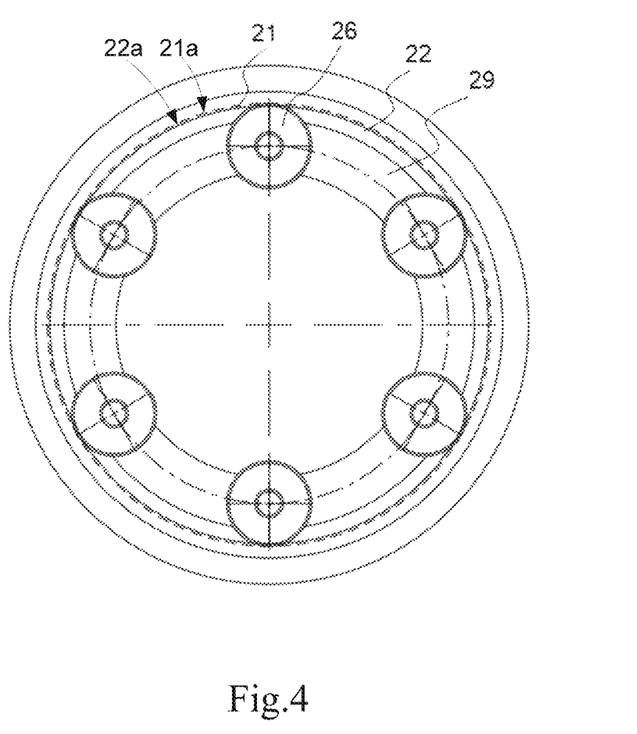
FIG. 4 is a top view of the speed reduction assembly of the speed reduction apparatus of Example Embodiment 1 of this disclosure.

The example embodiment of this disclosure provides a speed reduction apparatus. FIG. 1 is a cross sectional view of the speed reduction apparatus in an axial direction, FIG. 2 is a perspective cross sectional view of the speed reduction apparatus, FIG. 3 is a perspective view of the speed reduction assembly of the speed reduction apparatus, and FIG. 4 is a top view of the speed reduction assembly of the speed reduction apparatus.

As shown in FIG. 1, the speed reduction apparatus 10 includes a motor 1 and a speed reduction assembly 2.

The motor 1 includes: a first rotating shaft 18 and a second rotating shaft 17 rotating around a central axis C, a second rotator 13 configured at a radial outer side of the second rotating shaft 17 and a first rotator 14 configured at a radial outer side of the first rotating shaft 18, and a stator 19 configured between the second rotator 13 and the first rotator 14, that is, in the axial direction, the first rotator 14 is located at a front side of the stator 19, and the second rotator 13 is located at a rear side of the stator 19.

The motor 1 further includes: a first motor housing 12 configured at an axial side of the first rotator 14 away from the stator 19, that is, the first motor housing 12 is located at the front side of the stator 19; a second motor housing 11 configured at another axial side of the second rotator 13 away from the stator 19, that is, the second motor housing 11 is located at the rear side of the stator 19; and a first bearing 15 and a second bearing 16 configured at a radial outer side of the first rotating shaft 18, the first bearing 15 and the second bearing 16 being axially located at the same side of the first rotator 14 facing the first motor housing 12, i.e. the front side of the stator 19.

In this example embodiment, the speed reduction assembly 2 and the motor 1 are disposed in serial in an axial direction, and the speed reduction assembly 2 is disposed at a front side of the motor 1; for example, the speed reduction assembly 2 is located at a front side of the first motor housing 12.

As shown in FIG. 1, the speed reduction assembly 2 may include: a first gear 21 configured at a side of the first motor housing 12 away from the motor 1, that is, the first gear 21 is located at a front side of the first motor housing 12; third gears 26 engaging with the first gear 21, and a second gear 22; an output shaft 23, rotation of the third gears 26 around a rotating shaft 25 and revolution thereof around the central axis C being transmitted to the second gear 22, and the second gear 22 driving the output shaft 23; and a bracket 28 configured between the output shaft 23 and the first rotating shaft 18.

In this example embodiment, at least one of the first gear 21, the second gear 22 and the third gears 26 is located at radial outer sides of the first bearing 15 and the second bearing 16. For example, as shown in FIG. 1, the first gear 21, the second gear 22 and the third gears 26 are all located at the radial outer sides of the first bearing 15 and the second bearing 16.

In this example embodiment, as shown in FIG. 1, as the first bearing 15 and the second bearing 16 are both located at the front side of the stator 19 in the axial direction, a relatively large installation space surrounding the first bearing 15 and the second bearing 16 may be formed at the front side of the first motor housing 12 of the motor 1. The relatively large installation space being able to effectively accommodate at least one of the first gear 21, the second gear 22 and the third gears 26 of the speed reduction assembly 2, thereby enabling compact disposition of the motor 1 and the speed reduction assembly 2 both in the axial direction and in the radial direction.

In opposition to this, if the first bearing 15 and the second bearing 16 are respectively disposed at the front side and a rear side of the stator 19 in the axial direction, two relatively small installation spaces will be formed at the front side and the rear side of the stator 19 in the axial direction, neither of them being able to effectively accommodate the gears of the speed reduction assembly 2 as the above relatively large installation space.

In this example embodiment, the motor 1 includes two rotators, and is an axial-flux motor. Hence, the speed reduction apparatus may provide a relatively good driving capability.

In this example embodiment, as shown in FIGS. 1 and 2, the first rotating shaft 18 and the second rotating shaft 17 may be of hollow structures, hence, weights of the first rotating shaft and the second rotating shaft may be lowered.

As shown in FIGS. 1 and 2, the second rotating shaft 17 has a hole 171 extending in the axial direction, a connection member (not shown) used for connecting the first rotating shaft 18 to the second rotating shaft being provided in the hole 171. The connection member may be, for example, a bolt, or may be another connection member. Hence, the first rotating shaft 18 and the second rotating shaft 17 are connected together, forming a combined rotating shaft.

In this example embodiment, the combined rotating shaft formed by the first rotating shaft 18 and the second rotating shaft 17 may be mounted to the first housing 12 via the first bearing 15 and the second bearing 16. As there exist two bearings, shake of the combined rotating shaft may be reduced, and stability of the combined rotating shaft may be improved. Hence, stability of the whole speed reduction apparatus may be improved.

In this example embodiment, as shown in FIG. 1, the second bearing 16 may be located at a side away from the first rotator 14 in an axial direction of the first bearing 15, that is, the second bearing 16 is located at a front side of the first bearing 15. An end portion 121 of the first motor housing 12 away from the first rotator in the axial direction is flush with an end portion 161 of the second bearing 16 away from the first rotator in the axial direction, that is, the end portion 121 of the first motor housing 12 is flush with the end portion 161 of the second bearing 16. Hence, a size of the motor 1 in the axial direction may be reduced, thereby controlling a size of the speed reduction apparatus in the axial direction.

In this example embodiment, as shown in FIG. 1, a radially outermost end 211 of the first gear 21 is located at a position closer to a radially internal side than a radially outermost end 121 of the first motor housing 12. Hence, a radial size of the speed reduction assembly 2 may be reduced.

In this example embodiment, the bracket 28 may be connected to the first rotating shaft 18 by the bolt. Hence, the bracket 28 may be taken as input of the speed reduction assembly 2.

In this example embodiment, as shown in FIG. 1, a radially outermost end 28a of the bracket 28 is configured at a position closer to a radially internal side than a radially innermost end 23a of the output shaft 23. Hence, the bracket 28 will not interfere with rotation of the output shaft 23, and a radial thickness of the speed reduction assembly 2 may further be reduced. In this way, a radial thickness of the speed reduction apparatus may further be reduced.

In this example embodiment, the speed reduction assembly 2 may further include a bearing 27 configured at a radial outer side of the output shaft 23. The output shaft 23 may rotate in the bearing 27. Hence, the bearing 27 may mount the output shaft 23 on a housing 24 of the speed reduction assembly 2 (as shown in FIGS. 1 and 2).

In this example embodiment, as shown in FIG. 3, the number of the third gears 26 may be more than two, and the more than two third gears 26 are configured centered on the central axis C (not shown in FIG. 3). The number of the third gears 26 may be determined according to a reduction ratio that the speed reduction assembly needs to obtain. In one implementation, the number of the third gears 26 may be from 2-10; for example, the number of the third gears 26 is 6 in the implementation shown in FIG. 3.

In this example embodiment, the third gears 26 may be fixed to a rotating shaft 25 of the third gears 26, and a front end 25a of the rotating shaft 25 of the third gears may be mounted on the bracket 28. Hence, the third gears 26 may rotate around the rotating shaft 25 of the third gears on the bracket 28 via a journal bearing or a ball bearing.

Furthermore, as shown in FIG. 1, in this example embodiment, a rear end 25b of the rotating shaft 25 of the third gears may be mounted in a ring member 29, that is, the ring member 29 abuts against the rotating shaft 25 of the third gears. The ring member 29 may be configured between the third gears 26 and the first motor housing 12. The front end 25a and the rear end 25b of the rotating shaft 25 of the third gears may be respectively mounted to the bracket 28 and the ring member 29, thus, the rotating shaft 25 of the third gears may be stably mounted. Furthermore, the ring member 29 may be omitted in other example embodiments.

In this example embodiment, as shown in FIG. 1, the third gears 26 may be planetary gears, and the first gear 21 and the second gear 22 may be ring gears. The first gear 21 may be fixed to the first motor housing 12, the second gear 22 may, together with the first rotating shaft 18, rotate around the central axis C, and the third gears 26 may rotate around the central axis C within a radially inner circumference of the first gear 21 and the second gear 22, and may revolve around a rotating shaft.

As shown in FIGS. 4 and 1, inner diameters of the first gear 21 and the second gear 22 are different. For example, the inner diameter of the first gear 21 is greater than the inner diameter of the second gear 22, that is, a radial inner end 21a of the first gear 21 is located at a radial outer side of a radial inner end 22a of the second gear 22. However, this example embodiment is not limited thereto; for example, the inner diameter of the first gear 21 may also be smaller than the inner diameter of the second gear 22.

In this example embodiment, when the first gear 21 and the second gear 22 are ring gears, the inner diameters of the first gear 21 and the second gear 22 may be identical.

Figure 5:
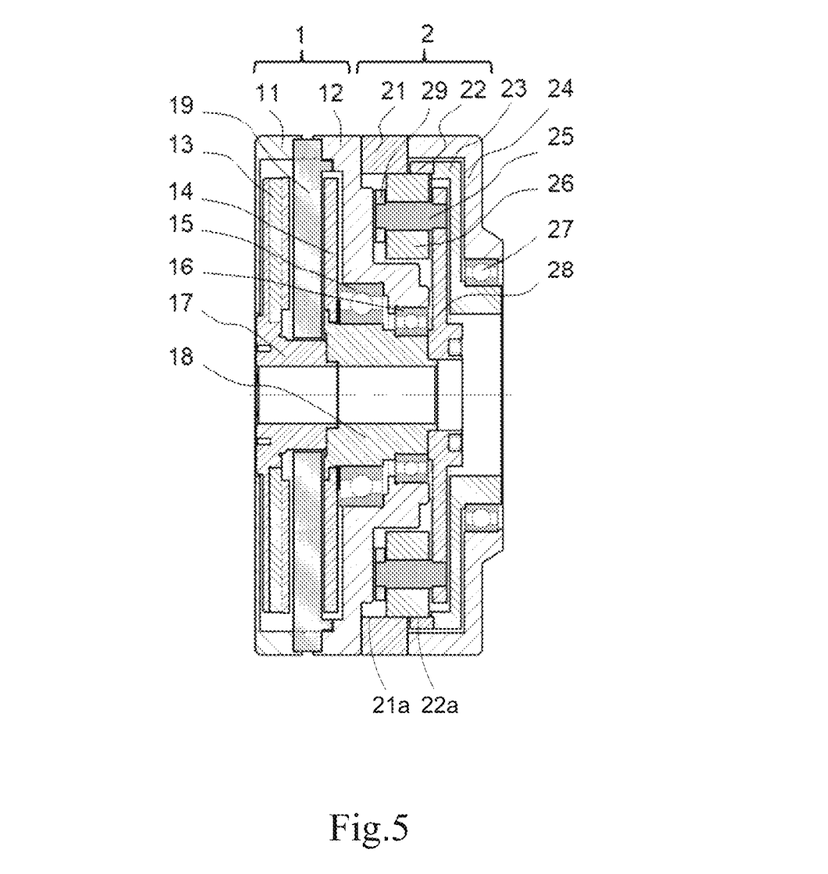
FIG. 5 is another cross-sectional view of the speed reduction apparatus in the axial direction of Example Embodiment 1 of this disclosure.
Figure 6:
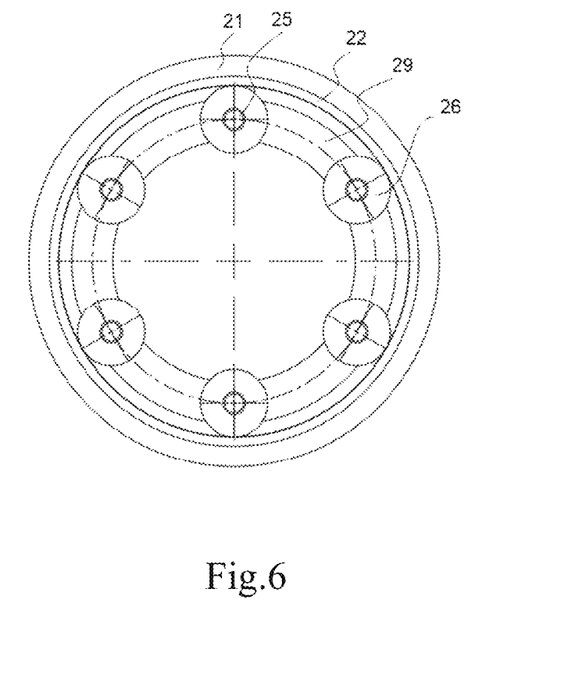
FIG. 6 is another top view of the speed reduction assembly of the speed reduction apparatus of Example Embodiment 1 of this disclosure.

FIG. 5 is another cross sectional view of the speed reduction apparatus in the axial direction of the example embodiment of this disclosure, and FIG. 6 is a top view of the speed reduction assembly of the speed reduction apparatus of the example embodiment of this disclosure. As shown in FIGS. 5 and 6, the inner diameters of the first gear 21 and the second gear 22 are identical, that is, a radial position of the radial inner end 21a of the first gear 21 is identical to that of the radial inner end 22a of the second gear 22. And furthermore, in FIGS. 5 and 6, reference numbers identical to those in FIGS. 1 and 4 denote identical components.

In this example embodiment, by adjusting sizes of the inner diameters of the first gear 21 and the second gear 22 as planetary gears, the reduction ratio of the speed reduction assembly may be adjusted. For example, in the speed reduction apparatus shown in FIGS. 1 and 4, the reduction ratio of the speed reduction assembly is 22, and in the speed reduction apparatus shown in FIGS. 5 and 6, the reduction ratio of the speed reduction assembly is 92.

According to this example embodiment, in the speed reduction apparatus, the two bearings of the dual-rotor motor are arranged at the same side of the stator in the axial direction, and the gears of the reducer disposed in parallel with the dual-rotor motor in the axial direction are located at radially outer sides of the two bearings. Hence, compact disposition of the dual-rotor motor and the reducer in the axial direction and the radial direction may be achieved, thereby obtaining a speed reduction apparatus having a relatively small volume and a relatively good driving capability.

Second Example Embodiment

The example embodiment of this disclosure provides a speed reduction apparatus, which differs from the speed reduction apparatus in Example Embodiment 1 by a different structure of a speed reduction assembly. In particular, in Example Embodiment 1, the first gear and the second gear are ring gears, while in Example Embodiment 2, the first gear and the second gear are sun gears.

Figure 7:
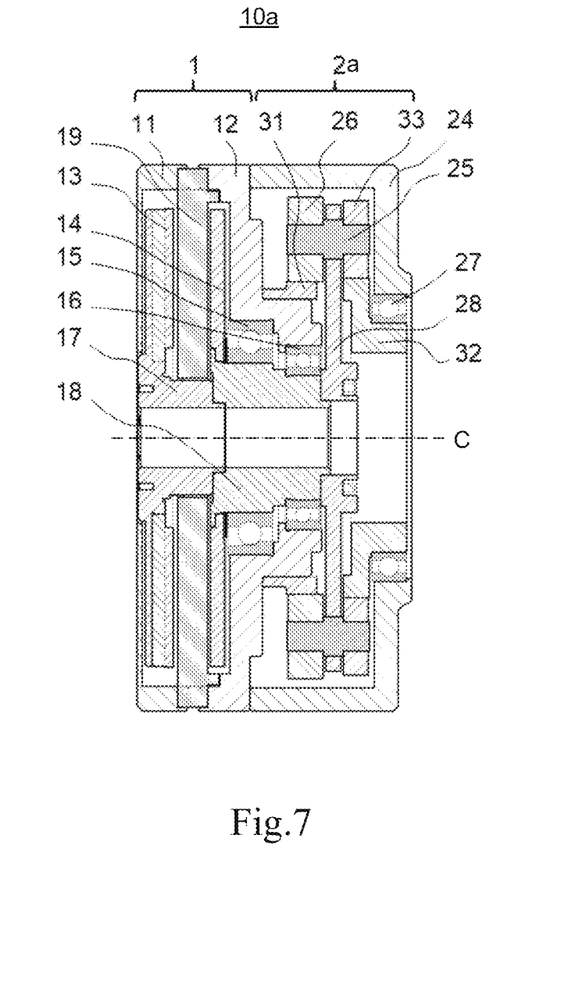
FIG. 7 is a cross sectional view of the speed reduction apparatus in an axial direction of Example Embodiment 2 of this disclosure.
Figure 8:
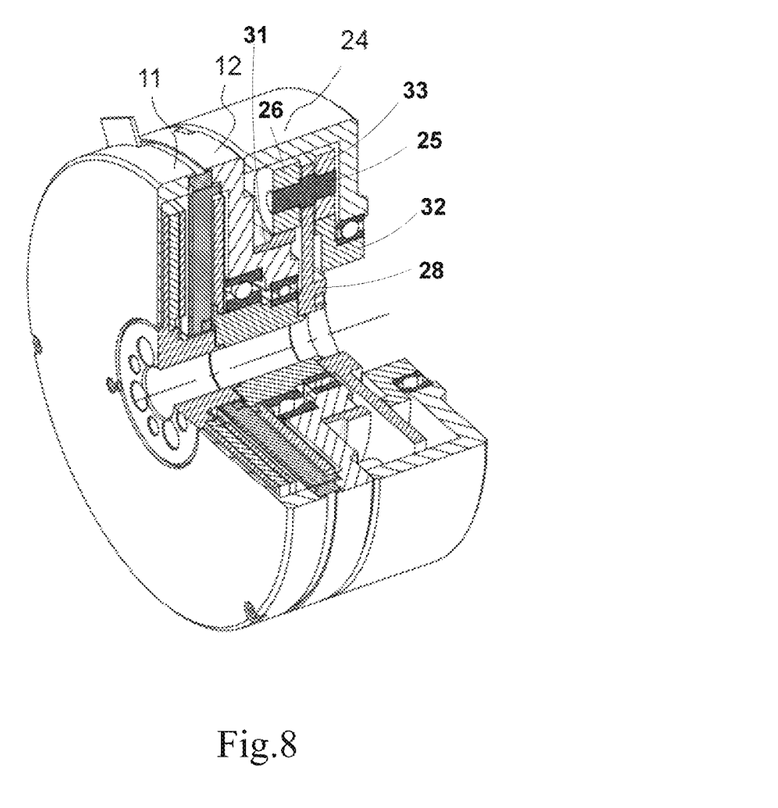
FIG. 8 is a perspective cross sectional view of the speed reduction apparatus of Example Embodiment 2 of this disclosure.
Figure 9:
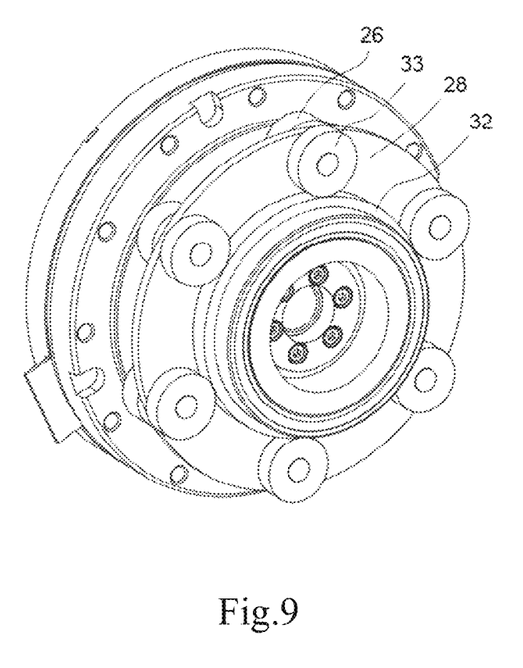
FIG. 9 is a perspective view of the speed reduction assembly of the speed reduction apparatus of Example Embodiment 2 of this disclosure.
Figure 10:
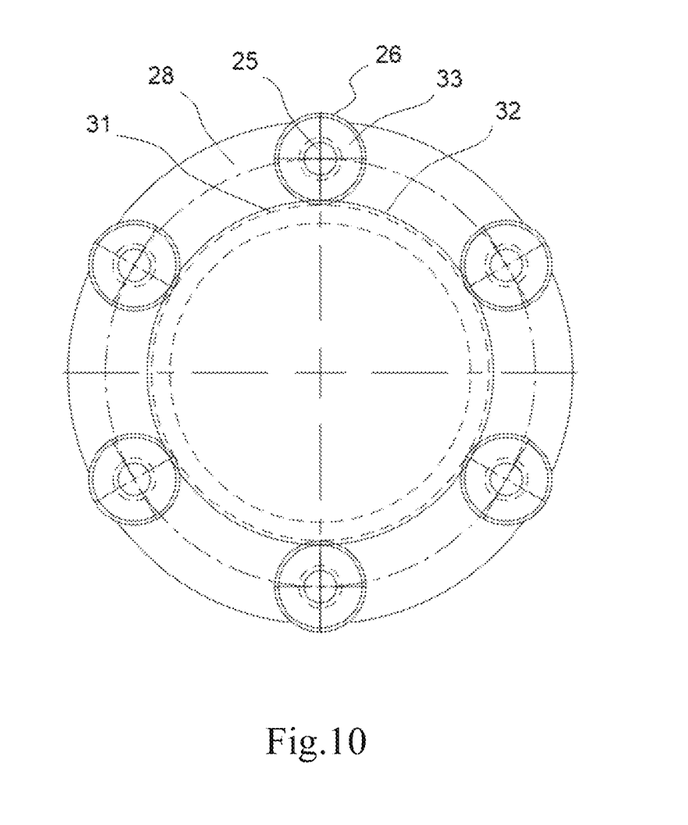
FIG. 10 is a top view of the speed reduction assembly of the speed reduction apparatus of Example Embodiment 2 of this disclosure.

FIG. 7 is a cross sectional view of the speed reduction apparatus in an axial direction, FIG. 8 is a perspective cross sectional view of the speed reduction apparatus, FIG. 9 is a perspective view of the speed reduction assembly of the speed reduction apparatus, and FIG. 10 is a top view of the speed reduction assembly of the speed reduction apparatus.

As shown in FIG. 7, the speed reduction apparatus 10a includes a motor 1 and a speed reduction assembly 2a; wherein a structure of the motor 1 is identical to that of the motor in Example Embodiment 1, which shall not be described herein any further.

The motor 1 includes: a first rotating shaft 18 and a second rotating shaft 17 rotating around a central axis C, a second rotator 13 configured at a radial outer side of the second rotating shaft 17 and a first rotator 14 configured at a radial outer side of the first rotating shaft 18, and a stator 19 configured between the second rotator 13 and the first rotator 14, that is, in the axial direction, the first rotator 14 is located at a front side of the stator 19, and the second rotator 13 is located at a rear side of the stator 19.

In this example embodiment, the speed reduction assembly 2a and the motor 1 are disposed in serial in an axial direction, and the speed reduction assembly 2a is disposed at a front side of the motor 1; for example, the speed reduction assembly 2a is located at a front side of the first motor housing 12.

As shown in FIG. 7, the speed reduction assembly 2a may include: a first gear 31 configured at a front side of the first motor housing 12, for example, the first gear 31 may be fixed at the front side of the first motor housing 12; third gears 26 and 33, and a second gear 32; the third gear 26 is engaged with the first gear 31, and the second gear 32 is disposed integrally with an output shaft 23, that is, the second gear 32 functions as the output shaft 23, and both the second gear 32 and the first rotating shaft 18 rotate around the central axis C; and a bracket 28 configured between the second gear 32 and the first rotating shaft 18; a rotating shaft 25 of the third gears 33 and 26 may be mounted to the bracket 28, and the third gears 33 and 26 are located at a front side and a rear side of the bracket 28, respectively.

In this example embodiment, at least one of the first gear 31, the second gear 32 and the third gears 26 and 33 is located at radial outer sides of the first bearing 15 and the second bearing 16. For example, as shown in FIG. 1, the first gear 31 and the third gears 26 and 33 are all located at the radial outer sides of the first bearing 15 and the second bearing 16. Hence, both the motor 1 and the speed reduction assembly 2a may be compactly disposed in the axial direction and in the radial direction.

In this example embodiment, as shown in FIGS. 7, 9 and 10, the third gears 26 and 33 may be planetary gears; wherein the third gears 26 and 33 may rotate around the central axis C within a radially inner circumference of the first gear 31 and the second gear 32, and may revolve around the rotating shaft 25.

Furthermore, in this example embodiment, as shown in FIGS. 7 and 8, as the bracket 28 supports an axial intermediate part of the rotating shaft 25, and the third gears 26 and 33 disposed at a front end and a rear end of the rotating shaft 25 are respectively engaged with the first gear 31 and the second gear 32, the rotating shaft 25 is relatively stable, and the ring member 29 in FIG. 1 needs not be disposed.

In this example embodiment, as shown in FIG. 7, the speed reduction assembly 2a may further include a bearing 27 configured at a radial outer side of the second gear 32. The second gear 32 may rotate in the bearing 27. Hence, the bearing 27 may mount the second gear 32 on a housing 24 of the speed reduction assembly 2a.

Furthermore, this disclosure is not limited to what is described in example embodiments 1 and 2, and the speed reduction assembly may also have other structures.

According to this example embodiment, in the speed reduction apparatus, the two bearings of the dual-rotor motor are arranged at the same side of the stator in the axial direction, and the gears of the reducer disposed in parallel with the dual-rotor motor in the axial direction are located at radially outer sides of the two bearings. Hence, compact disposition of the dual-rotor motor and the reducer in the axial direction and the radial direction may be achieved, thereby obtaining a speed reduction apparatus having a relatively small volume and a relatively good driving capability.

Third Example Embodiment

The example embodiment of this disclosure provides an electromechanical device, comprising the speed reduction apparatus as described in Example Embodiment 1 or 2. As the structure of the speed reduction apparatus has been described in detail Example Embodiment 1 or 2, the contents of which is incorporated herein, and shall not be described herein any further.

According to this example embodiment, in the speed reduction apparatus, the two bearings of the dual-rotor motor are arranged at the same side of the stator in the axial direction, and the gears of the reducer disposed in parallel with the dual-rotor motor in the axial direction are located at radially outer sides of the two bearings. Hence, compact disposition of the dual-rotor motor and the reducer in the axial direction and the radial direction may be achieved, thereby obtaining a speed reduction apparatus having a relatively small volume and a relatively good driving capability.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A speed reduction apparatus, comprising:
a motor; and
a speed reduction assembly; wherein
the motor includes:
a first rotating shaft and a second rotating shaft rotating around a central axis which extends in an axial direction;
a second rotator and a first rotator respectively provided at radial outer sides of the second rotating shaft and the first rotating shaft;
a stator between the second rotator and the first rotator;
a first motor housing at an axial side of the first rotator spaced away from the stator; and
a second motor housing at another axial side of the second rotator spaced away from the stator;
the speed reduction assembly includes:
a first gear at a side of the first motor housing spaced away from the motor;
a second gear;
third gears engaging with the first gear;
an output shaft, the third gears turning the second gear to rotate, and the second gear driving the output shaft; and
a bracket between the output shaft and the first rotating shaft; wherein the motor further includes:
a first bearing and a second bearing at a radial outer side of the first rotating shaft;

the first bearing and the second bearing are axially located at the same side of the first rotator facing the first motor housing;
central axes of the first gear, the second gear and the third gears are all located at an axial outer side of the first motor housing and are all located radially inside of an outer diameter of the first motor housing when viewed along the axial direction; and
at least one of the first gear, the second gear and the third gears is located at radial outer sides of the first bearing and the second bearing.

2. The speed reduction apparatus according to claim 1, wherein the speed reduction assembly includes a ring that is located between the third gears and the first motor housing and abuts against a rotating shaft of the third gears.

3. The speed reduction apparatus according to claim 1, wherein the second rotating shaft includes a hole extending in an axial direction, and a connector to connect the first rotating shaft to the second rotating shaft provided in the hole.

4. The speed reduction apparatus according to claim 3, wherein the connector includes a bolt.

5. The speed reduction apparatus according to claim 1, wherein
the second bearing is located at a side spaced away from the first rotator in an axial direction of the first bearing; and
an end portion of the first motor housing spaced away from the first rotator in the axial direction is flush with an end portion of the second bearing spaced away from the first rotator in the axial direction.

6. The speed reduction apparatus according to claim 1, wherein a radially outermost end of the bracket is provided at a position closer to a radially internal side than a radially innermost end of the output shaft.

7. The speed reduction apparatus according to claim 1, wherein a number of the third gears is more than two, and the more than two third gears are centered on the central axis.

8. The speed reduction apparatus according to claim 7, wherein the first gear and the second gear are ring gears or sun gears, and the third gears are planetary gears.

9. The speed reduction apparatus according to claim 8, wherein the first gear and the second gear are ring gears, and inner diameters of the first gear and the second gear are identical or different.

10. The speed reduction apparatus according to claim 1, wherein the motor is an axial-flux motor.

11. The speed reduction apparatus according to claim 1, wherein the speed reduction assembly includes a bearing at a radial outer side of the output shaft.

12. The speed reduction apparatus according to claim 1, wherein a radially outermost end of the first gear is located at a position closer to a radially internal side than a radially outermost end of the first motor housing.

13. An electromechanical device comprising the speed reduction apparatus according to claim 1.

14. The speed reduction apparatus according to claim 1, wherein the first gear, the second gear and the third gears are all located to overlap the second rotator and the first rotator when viewed along the axial direction.

* * * * *